United States Patent
Abhau (10) Patent No.: US 9,911,051 B2
(45) Date of Patent: Mar. 6, 2018

(54) METHOD AND APPARATUS FOR CONFIRMATION OF RELEVANT WHITE INNER CIRCLE IN ENVIRONMENT OF CIRCULAR TRAFFIC SIGN RECOGNITION

(71) Applicant: MANDO CORPORATION, Gyeonggi-do (KR)

(72) Inventor: Jochen Abhau, Frankfurt am Main (DE)

(73) Assignee: MANDO CORPORATION, Gyeonggi-Do (KR)

( * ) Notice: Subject to any disclaimer, the term of this patent is extended or adjusted under 35 U.S.C. 154(b) by 27 days.

(21) Appl. No.: 15/088,090

(22) Filed: Mar. 31, 2016

(65) Prior Publication Data

US 2016/0321511 A1 Nov. 3, 2016

(30) Foreign Application Priority Data

Apr. 29, 2015 (DE) .................... 10 2015 207 902

(51) Int. Cl.
*G06K 9/00* (2006.01)
(52) U.S. Cl.
CPC ................ *G06K 9/00818* (2013.01)
(58) Field of Classification Search
CPC ................................. G06K 9/00818
See application file for complete search history.

(56) References Cited

U.S. PATENT DOCUMENTS

| 2006/0034484 | A1* | 2/2006 | Bahlmann | G06K 9/00818 382/103 |
|---|---|---|---|---|
| 2012/0002053 | A1* | 1/2012 | Stein | G06K 9/00818 348/148 |

FOREIGN PATENT DOCUMENTS

| JP | 2014-67302 | 4/2014 |
|---|---|---|
| KR | 10-1353052 | 1/2014 |
| KR | 10-2015-0029122 | 3/2015 |

OTHER PUBLICATIONS

Vavilin Andrey and Kang Hyun Jo, "Automatic Detection and Recognition of Traffic Signs Using Geometric Structure Analysis", Oct. 2006, SICE-ICASE International Joint Conference, pp. 1451-1456.*
The-Chuan Chen and Kuo-Liang Chung, "An Efficient Randomized Algorithm for Detecting Circles", 2001, Computer Vision and Image Understanding 83, pp. 172-191.*
Office Action dated May 25, 2017 for Korean Patent Application No. 10-2016-0052750 and its English machine translation by Global Dossier.
Notice of Allowance dated Nov. 8, 2017 for Korean Patent Application No. 10-2016-0052750 and its English translation provided by Applicant's foreign council.

* cited by examiner

*Primary Examiner* — Siamak Harandi
(74) *Attorney, Agent, or Firm* — Ladas & Parry, LLP

(57) ABSTRACT

The present invention relates to an apparatus for confirming circular traffic sign recognition including: an image acquisition unit configured to photograph a front of a vehicle using a camera to acquire a front image; a sign recognition unit configured to detect circular shapes indicating circles of objects in the front image, classify traffic sign circles indicating a traffic sign for the circles, and recognize the circular traffic sign; and a control unit configured to confirm the circular traffic sign recognition using a white inner circle and inform a driver of contents of the confirmed circular traffic sign.

10 Claims, 6 Drawing Sheets

METHOD AND APPARATUS FOR CONFIRMATION OF RELEVANT WHITE INNER CIRCLE IN ENVIRONMENT OF CIRCULAR TRAFFIC SIGN RECOGNITION

CROSS-REFERENCE TO RELATED APPLICATION

This application claims the priority to German Patent Application No. 102015207902.3, filed on Apr. 29, 2015, the disclosure of which is incorporated herein by reference in its entirety.

BACKGROUND OF THE INVENTION

Field of the Invention

Exemplary embodiments of the present invention relate to improved traffic sign recognition of a driver assistant system capable of classifying circular shapes indicating circles of objects in a front image acquired by a front looking camera equipped in a vehicle and recognizing the classified circles as a circular traffic sign when the classified circles are associated with a white inner circle.

Description of the Related Art

In recent years, a driver assistant system may automatically provide traffic information to a driver in real time to promote driving convenience and accident prevention.

Among the driving assistant systems, a traffic sign recognition (TSR) system is a system which uses a camera equipped in a vehicle to recognize a front traffic sign to inform a driver of a current limit speed, a lowest speed, and other road information.

In particular, accurately recognizing the traffic sign using an image is very important in performance of the TSR system.

An advanced driver assistance system (ADAS) image recognition apparatus processes an image input in a digital form through the camera based on a numerical analysis technique, and therefore performance of the ADAS image recognition apparatus may largely rely on characteristics of the input image.

A reflective traffic sign goes through a process of allowing sunlight reflected from the traffic sign during the day and streetlights and headlights of a self vehicle and other vehicles mainly reflected from the traffic sign during the night to be incident on the camera of the ADAS image recognition apparatus and then converting the reflected sunlight and streetlights and headlights into digital images, and therefore is greatly affected by brightness or directions of surrounding light sources.

On the other hand, an emissive traffic sign is not affected by surrounding light sources since light generated from its own light source is incident on the camera of the image recognition apparatus, regardless of other light sources. Due to the difference in characteristics as described above, it is difficult to recognize two kinds of traffic signs by photographing the traffic signs using the same camera.

RELATED ART DOCUMENT

Patent Document

Korean Patent No. 10-1353052 (Registered date: Jan. 13, 2014)

SUMMARY OF THE INVENTION

An object of the present invention relates to provide an apparatus and a method for confirming circular traffic sign recognition capable of classifying circular shapes indicating circles of objects in a front image acquired by a front looking camera equipped in a vehicle and recognizing the classified circles as a circular traffic sign when the classified circles are associated with a white inner circle and confirming the recognition.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

An apparatus for confirming circular traffic sign recognition includes: an image acquisition unit configured to photograph a front of a vehicle using a camera to acquire a front image; a sign recognition unit configured to detect circular shapes indicating circles of objects in the front image, classify traffic sign circles indicating a traffic sign for the circles, and recognize the circular traffic sign; and a control unit configured to confirm the circular traffic sign recognition using a white inner circle and inform a driver of contents of the confirmed circular traffic sign.

The control unit may set a base reference area $R_B$ at a center of the classified traffic sign circle, set one or a plurality of edge areas R1, R2, . . . , Rn, and calculate a reference value $V_B$ for comparison from the base reference area $R_B$.

The control unit may verify a circle at which the white inner circle is accurately positioned when a maximum intensity of the area is brighter than the reference value $R_B$ for comparison or a ratio of pixels within the certain tolerance satisfies a minimum quality threshold value, with respect to the one or plurality of edge areas Rj.

The control unit may set the base reference area $R_B$ at the center of the classified traffic sign circle and set one or the plurality of edge areas R1, R2, . . . , Rn within a radius r from the center.

The control unit may confirm the circular traffic sign recognition as being correct by the white inner circle being accurately positioned when a ratio of pixels depending on sharpness of each area is brighter than the reference value for comparison or satisfies the minimum quality threshold value based on the white inner circles of a traffic sign partitioned in a red color or a clear traffic sign, with respect to the classified traffic sign circles.

A method for confirming circular traffic sign recognition includes: acquiring a front image by photographing a front of a vehicle using a camera; detecting circular shapes indicating circles of objects in the front image; classifying traffic sign circles indicating a traffic sign for the circles; recognizing a circular traffic sign for the classified traffic sign circles; and confirming the circular traffic sign recognition using a white inner circle.

To achieve the above objects, according to an exemplary embodiment of the present invention, there is provided a processor for confirming circular traffic sign recognition. The processor may be connected to an image acquisition unit configured to photograph a front of a vehicle using a camera to acquire a front image; and a sign recognition unit configured to detect circular shapes indicating circles of objects in the front image, classify traffic sign circles indicating a traffic sign for the circles, and recognize the circular traffic sign. The processor may be configured to perform a control to confirm the circular traffic sign recognition using a white inner circle and inform a driver of contents of the confirmed circular traffic sign.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Hereinafter, exemplary embodiments of the present invention will be described in detail with reference to the accompanying drawings so that those skilled in the art may easily practice the present invention. As those skilled in the art would realize, the described embodiments may be modified in various different ways, all without departing from the spirit or scope of the present invention.

A part irrelevant to the description will be omitted to clearly describe the present invention, and the same elements will be designated by the same reference numerals throughout the specification.

In addition, throughout the present specification, when any one part is referred to as being "connected to" another part, it means that any one part and another part are "directly connected to" each other or are "electrically connected to" each other with the other part interposed therebetween. In addition, unless explicitly described to the contrary, "comprising" any components will be understood to imply the inclusion of other elements rather than the exclusion of any other elements.

The mention that any portion is present "over" another portion means that any portion may be directly formed on another portion or a third portion may be interposed between one portion and another portion. In contrast, the mention that any portion is present "just over" another portion means that a third portion may not be interposed between one portion and another portion.

Terms used throughout the specification, 'first', 'second', 'third', etc. can be used to describe various portions, components, regions, layers, and/or sections but are not limited thereto. These terms are used only to differentiate any portion, component, region, layer, or section from other portions, components, regions, layers, or sections. Therefore, a first portion, component, region, layer, or section which will be described below may be mentioned as a second portion, component, region, layer, or section without departing from the scope of the present invention.

Terminologies used herein are to mention only a specific exemplary embodiment, and does not limit the present invention. Singular forms used herein include plural forms as long as phrases do not clearly indicate an opposite meaning. A term "including" used in the present specification concretely indicates specific properties, regions, integer numbers, steps, operations, elements, and/or components, and is not to exclude presence or addition of other properties, regions, integer numbers, steps, operations, elements, components, and/or a group thereof.

The term expressing the relative space of "under", "over", and the like may be used to more easily describe the relationship between other portions of one portion which is illustrated in the drawings. The terms intend to include other meanings or operations of apparatuses which are being used along with the intended meaning in the drawings. For example, overturning the apparatus in the drawings, any portions described as being positioned "under" other portions will be described as being positioned "over" other portions. Therefore, the exemplified term "under" includes both of the up and down directions. An apparatus may rotate by 90° or may rotate at different angles and the term expressing a relative space is interpreted accordingly.

All terms including technical terms and scientific terms used herein have the same meaning as the meaning generally understood by those skilled in the art to which the present invention pertains unless defined otherwise. Terms defined in a generally used dictionary are additionally interpreted as having the meaning matched to the related art document and the currently disclosed contents and are not interpreted as ideal or formal meaning unless defined.

Hereinafter, exemplary embodiments of the present invention so as to be easily practiced by a person skilled in the art to which the present invention pertains will be described in detail with reference to the accompanying drawings. However, the present invention may be modified in various different ways and is not limited to the embodiments provided in the present description.

Figure 1:
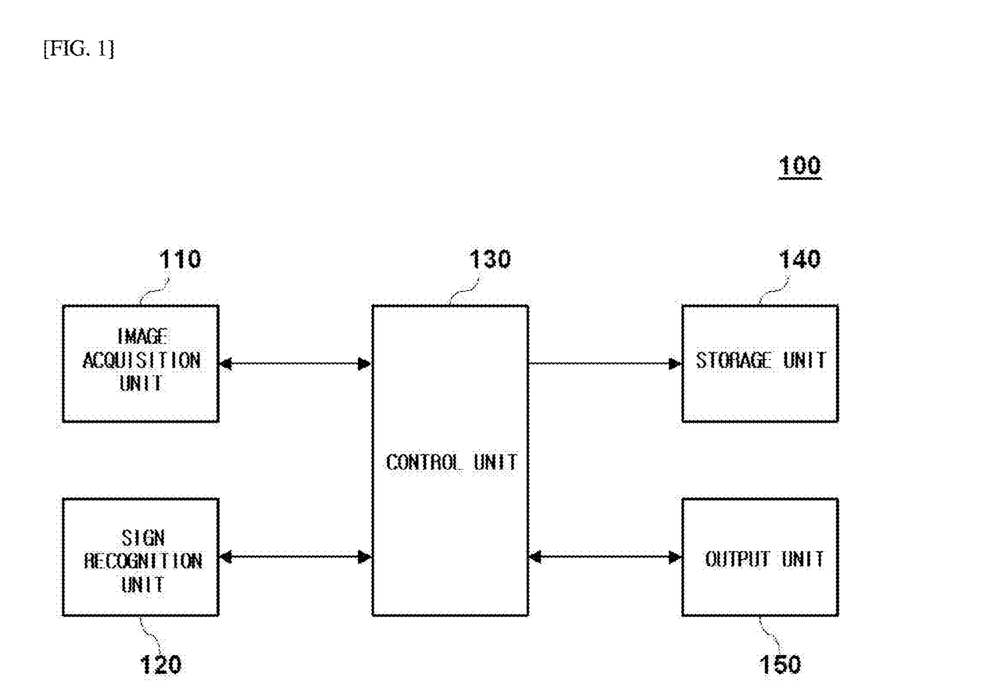
FIG. 1 is a configuration diagram illustrating a function block of an apparatus for confirming circular traffic sign recognition according to an exemplary embodiment of the present invention.

FIG. 1 is a configuration diagram illustrating a function block of an apparatus for confirming circular traffic sign recognition according to an exemplary embodiment of the present invention.

Referring to FIG. 1, an apparatus 100 for confirming traffic sign recognition according to an exemplary embodiment of the present invention includes an image recognition unit 110, a sign recognition unit 120, a control unit 130, a storage unit 140, and an output unit 150.

The image acquisition unit 110 photographs a front of a vehicle using a camera to acquire a front image.

Figure 3:
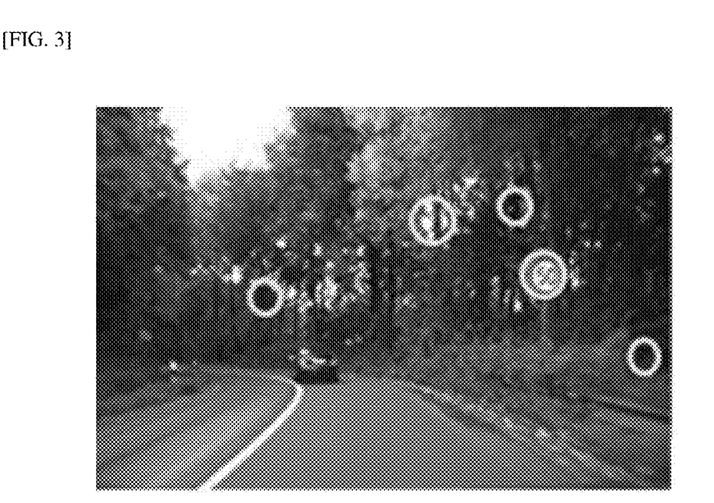
FIG. 3 is a diagram illustrating an example of detecting circular shapes indicating circles of objects in a front image, according to an exemplary embodiment of the present invention.
Figure 4:
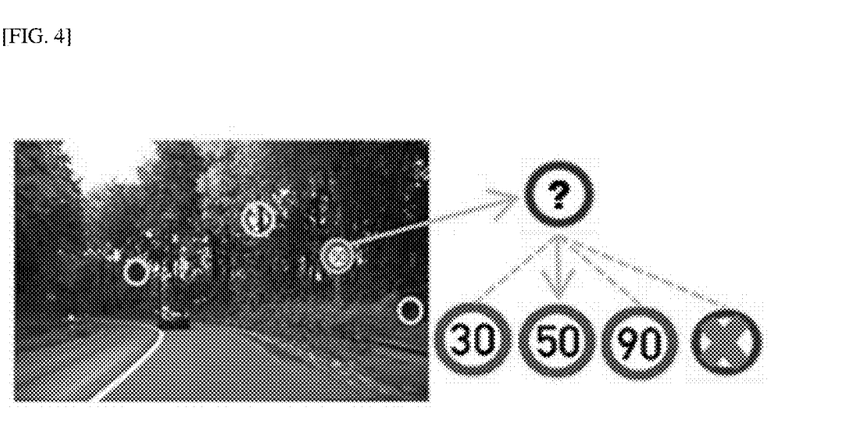
FIG. 4 is a diagram illustrating an example of classifying traffic sign circles indicating a traffic sign among the circles detected in the front image, according to an exemplary embodiment of the present invention.

The sign recognition unit 120 detects circular shapes indicating circles of objects in the acquired front image as illustrated in FIG. 3, classifies traffic sign circles indicating the traffic sign as illustrated in FIG. 4 with respect to the circles, and recognizes the circular traffic sign for the classified circles.

The control unit 130 performs a control to confirm the circular traffic sign recognition based on a white inner circle and inform a driver of contents of the confirmed circular traffic sign.

The storage unit 140 stores the front image acquired by the image acquisition unit 110 as an image file or a data having a digital form to analyze the front image.

The output unit 150 outputs the contents of the circular traffic sign as an image or a voice to inform a driver of the contents of the circular traffic sign. That is, the output unit 150 includes a display unit to output the contents of the circular traffic sign on a screen and includes a speaker or a sound output unit to output the contents of the circular traffic signal as an audible sound which may be heard by the driver.

Figure 7:
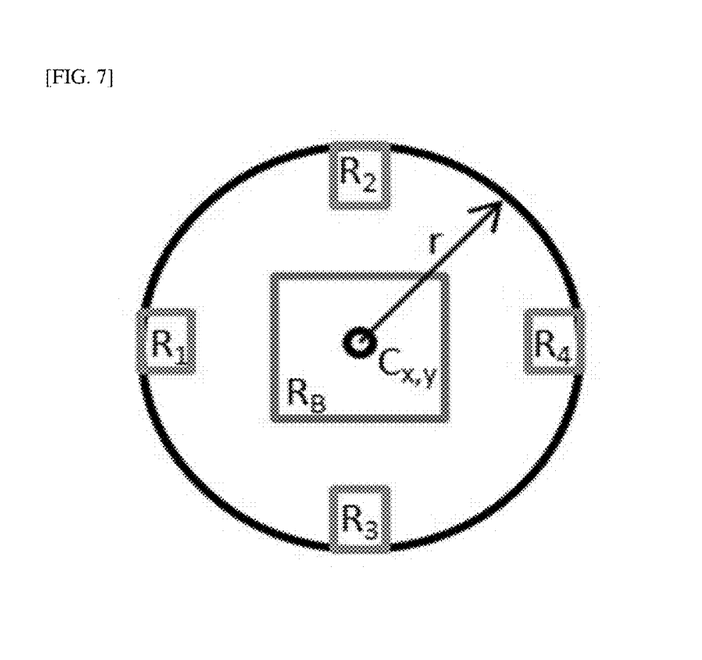
FIG. 7 is a diagram illustrating an example of defining areas for confirmation inspection according to the exemplary embodiment of the present invention.

The control unit 130 may set a base reference area $R_B$ at a center of the traffic sign circle, set one or a plurality of edge areas R1, R2, . . . , Rn, and calculate a reference value $V_B$ for comparison from the base reference area $R_B$, as illustrated in FIG. 7. That is, the control unit 130 may set the base reference area $R_B$ based on the center of the classified traffic sign circle and set one or the plurality of edge areas R1, R2, . . . , Rn within a radius r from the center.

The control unit 130 may verify a circle at which the white inner circle is accurately positioned when the maximum intensity of the area is brighter than the reference value $R_B$ for comparison or a ratio of pixels within a certain tolerance satisfies a minimum quality threshold value, one or the plurality of edge areas Rj.

Figure 8:
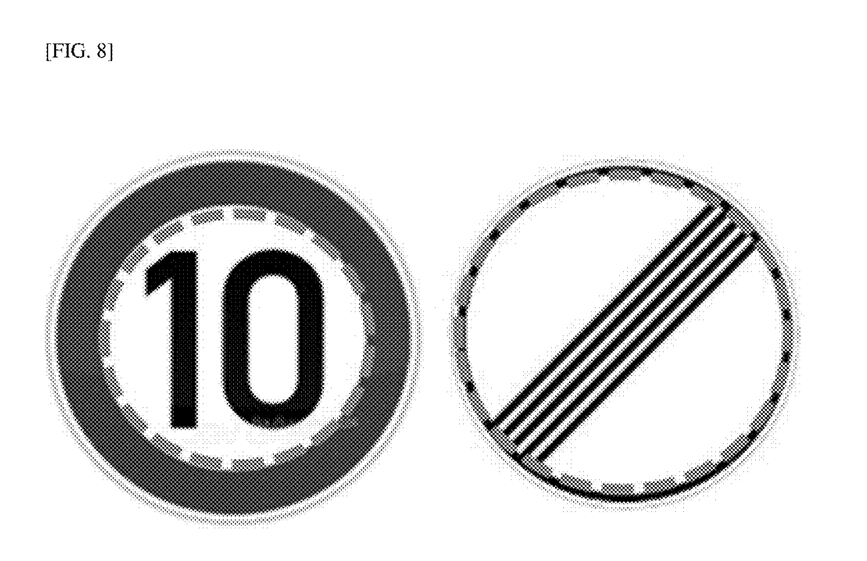
FIG. 8 is a diagram illustrating an example of a white circle optimally targeted according to the exemplary embodiment of the present invention.

The control unit 130 may confirm the circular traffic sign recognition as being correct by the white inner circle being accurately positioned when a ratio of pixels depending on sharpness of each area is brighter than the reference value for comparison or satisfies the minimum quality threshold value based on the white inner circles of a traffic sign partitioned in a red color or a clear traffic sign as illustrated in FIG. 8, with respect to the classified traffic sign circles.

Figure 2:
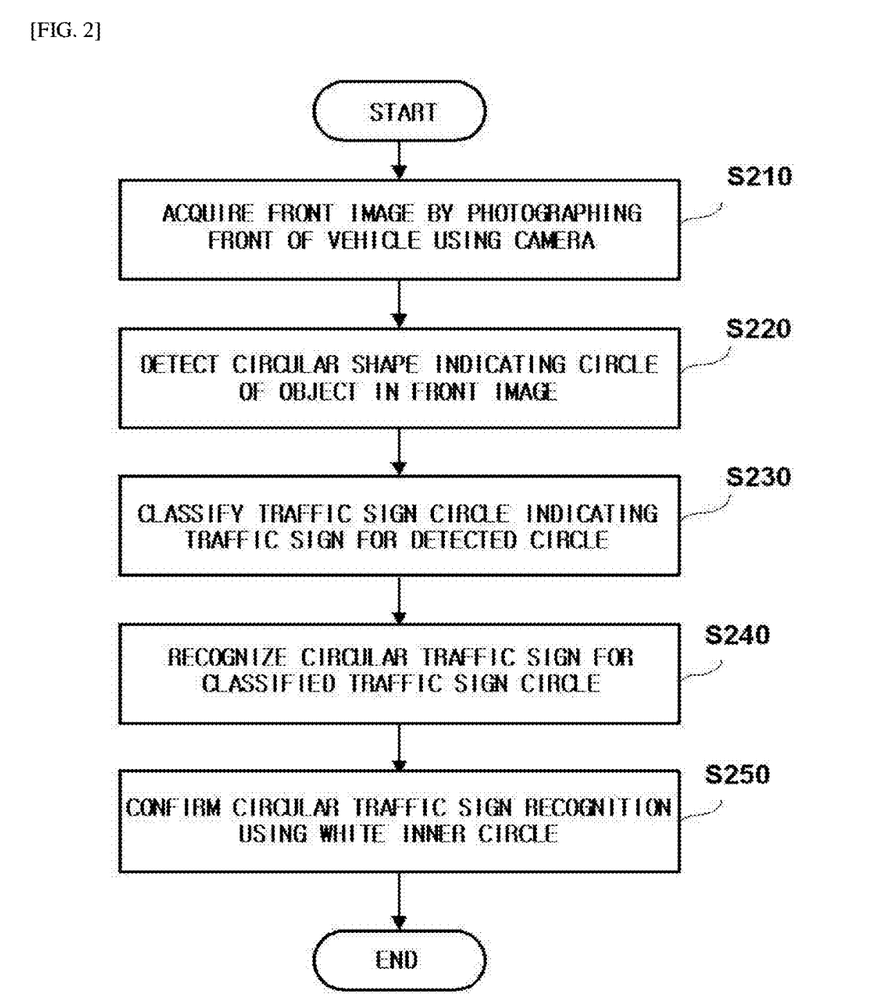
FIG. 2 is a diagram illustrating an operation flow chart for describing a method for confirming circular traffic sign recognition according to an exemplary embodiment of the present invention.

FIG. 2 is a diagram illustrating an operation flow chart for describing a method for confirming circular traffic sign recognition according to an exemplary embodiment of the present invention.

The apparatus 100 for confirming circular traffic sign recognition according to the exemplary embodiment of the present invention basically relates to improved traffic sign recognition of a driver assistant system for a vehicle and detects and recognizes a scene for a traffic sign like speed limits signs or end-of-limit signs which are in front of a vehicle by using a front looking camera.

Referring to FIG. 2, the image acquisition unit 110 acquires the front image by photographing the front of the vehicle using the camera (S210).

Next, the sign recognition unit 220 detects the circular shapes indicating the circles of objects in the front image as illustrated in FIG. 3 (S220). FIG. 3 is a diagram illustrating an example of detecting the circular shapes indicating the circles of objects in the front image, according to an exemplary embodiment of the present invention. In a recognition process of the traffic sign, one major step detects the sign itself as illustrated in FIG. 3. This needs to be detected before a sign type like a speed limit or no parking is determined. The circular traffic sign may be detected through designed circle detection such as circle hough transformation or fast radial symmetry transformation. As illustrated as a yellow circle in FIG. 3, one detected while many potential candidates which go through any detection approach the circles is not a traffic sign.

Next, the sign recognition unit 220 classifies the traffic sign circles indicating the traffic signal as illustrated in FIG. 4, with respect to the detected circles (S230). FIG. 4 is a diagram illustrating an example of classifying traffic sign circles indicating a traffic sign among the circles detected in the front image, according to an exemplary embodiment of the present invention. That is, as illustrated in FIG. 4, the same circles in which numerals or symbols of the traffic sign are present within the circle are detected in multiplicity and thus are separately classified.

Figure 5:
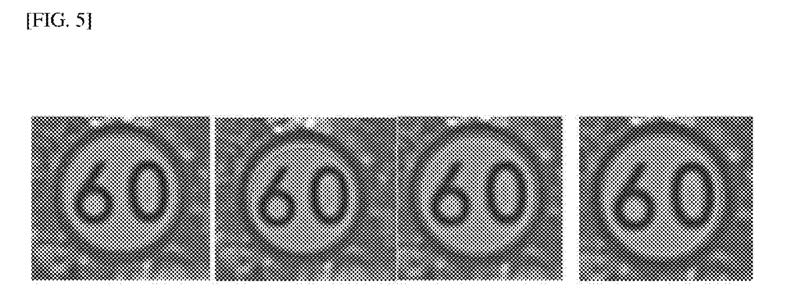
FIG. 5 is a diagram illustrating an example of the traffic sign circles classified according to the exemplary embodiment of the present invention.

According to the exemplary embodiment of the present invention, a process of classifying the circular shapes indicating the circles of objects in a possibly precise image is very important. The case in which the circles are sufficiently collected as illustrated in FIG. 5 may often occur even by some circular shapes or several portions of the circles recognized as the circular shapes acquired from two adjacent circles when the sign recognition unit 220 detects and classifies the circular shapes in multiplicity in the front image. FIG. 5 is a diagram illustrating an example of the traffic sign circles classified according to the exemplary embodiment of the present invention. In FIG. 5, a left image shows a multiple detection by a circle detection algorithm like the circle hough transformation and two of the center show bad circles. A right image shows an optimal circle representation for an inner circle.

Figure 6:
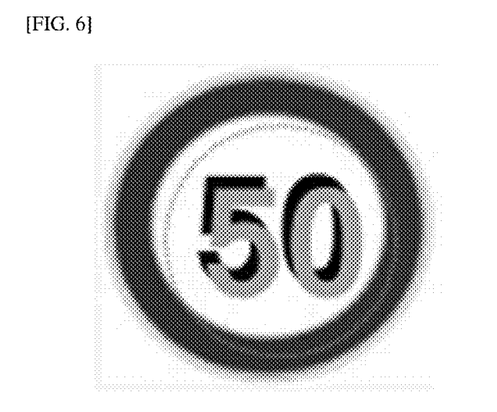
FIG. 6 is a diagram illustrating an example in which a circle is shifted in all pattern models, according to the exemplary embodiment of the present invention.

The classification is based on the contents of the accurate circle and therefore already small shifts may be led to misclassifications in a later process. Therefore, patterns in the recognized circle will not be fit for expectation patterns of a model as illustrated in FIG. 6. FIG. 6 is a diagram illustrating an example in which the circle is shifted in all pattern models, according to the exemplary embodiment of the present invention. In FIG. 6, a gray pattern of the center expects exactly 50. The circle which is not precisely recognized like two images of the center of FIG. 5 is shifted right down in all the pattern models. The traffic sign result represented by a black portion in the image of FIG. 6 will not be fit for an expected gray model pattern. Therefore, this may be considered as misclassification.

Next, the sign recognition unit 220 recognizes the circular traffic sign for the classified traffic sign circles (S240).

The traffic sign is generally divided into an attention sign, a regulation sign, and an instruction sign as the following Table 1 and most of the circular traffic signs correspond to the regulation sign or the instruction sign.

TABLE 1

| Division | Form | Edge hue | Inner background hue |
|---|---|---|---|
| Attention sign | Triangle | Red | Yellow |
| Regulation sign | Circle, Inverted triangle, Octagon | Red | White, Yellow |
| Instruction sign | Circle, Triangle, Quadrangle | Blue | — |
| Auxiliary sign | Quadrangle | Black | White |

The circular traffic sign represents a circular shape according to shape characteristics and according to color characteristics, the edge hue is red in the case of the regulation sign and represents blue in the case of the instruction sign, and the inner background color represents white or blue in the case of the regulation sign.

Therefore, the sign recognition unit 220 may recognize the circular traffic sign based on the color and shape characteristics of the circular edge hue and the inner background hue for the traffic sign circles.

Here, the process of recognizing the circular traffic sign based on the color and shape characteristics of the traffic sign will be described in more detail.

First, the color characteristics may be separated by the HSV color space within the front image. Generally, the HSV color space within the image is represented bit by bit depending on the characteristics of the camera, and therefore it is difficult to limit a range for each hue separation within the HSV color space. Therefore, the HSV color space within the image acquired by the specific camera is defined and then the color range for hue separation is set within the defined HSV color space, thereby separating the color characteristics.

The HSV color space is one method representing a color and a method for disposing a color according to the method, a specific color is designated using coordinates of hue, saturation, and brightness value. The HSV is also called HSB and consists of hue, saturation, and brightness value.

In the hue, a color value H means a relative disposition angle when blue having the longest wavelength is set to be 0° in a hue circle in which visible spectrum is disposed in a ring shape. Therefore, the H value ranges from 0° to 360°, in which 360° and 0° represent blue which is the same hue. In the saturation, a saturation value S represents a dark degree when the darkest state of the specific hue is set to be 255. The saturation value 0 represents an achromatic color having the same brightness value. In the brightness value, a brightness value V or B represents a bright degree when white is set to be 255 and black is set to be 0.

Figure 10:
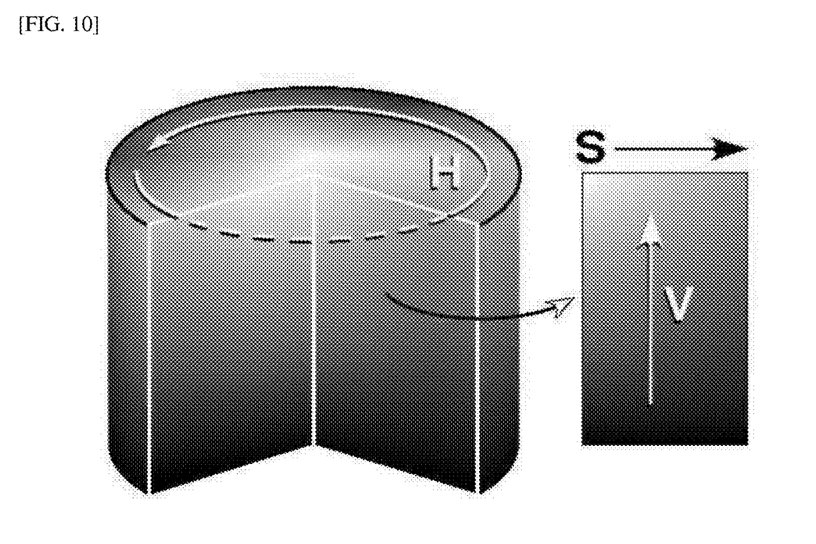
FIG. 10 is a diagram illustrating an example of an HSV color space model having a cylinder shape which is applied to the exemplary embodiment of the present invention.

An example of a model representing the HSV color space may include a three-dimensional figure of a cylinder or a turned cone and in the exemplary embodiment of the present invention, the range is set using the cylindrical shape. FIG. 10 is a diagram illustrating an example of the HSV color space model having the cylindrical model which is applied to the exemplary embodiment of the present invention. As illustrated in FIG. 10, the HSV color space is represented by a cylinder depending on a definition of a component having a cylindrical shape within the HSV color space, in which a surface of the cylinder and one point in the cylinder represents one color. Here, the hue value is represented by an angle and designates in which direction of a horizontal cross section of the cylinder the designated color is positioned. Further, the saturation corresponds to a radius and the achromatic color is positioned at the center of the cylinder and the darkest saturation is positioned at a surface of the cylinder. The brightness corresponds to a height and is getting brighter toward the top. In the cylindrical shape, each RGB value is scaled to a range from 0 to 1 and thus is transformed to the H, S, and V values by the following Equation 1.

$$V \leftarrow \max(R, G, B)$$ [Equation 1]

$$S \leftarrow \begin{cases} \dfrac{V - \min(R, G, B)}{V} & \text{if } V \neq 0 \\ 0 & \text{otherwise} \end{cases}$$

-continued $$H \leftarrow \begin{cases} 60(G - B)/S & \text{if } V = R \\ 120 + 60(B - R)/S & \text{if } V = G \\ 240 + 60(R - G)/S & \text{if } V = B \end{cases}$$

if $H < 0$ then $H \leftarrow H + 360$

By the above Equation 1, the H, S, and V values within a range of $0 \leq V \leq 1$, $0 \leq S \leq 1$, and $0 \leq H \leq 360$ may be obtained. According to the exemplary embodiment of the present invention, for computation convenience, the range of the H, S, and V values may be scaled to a range like $V \leftarrow 255V$, $S \leftarrow 255S$, and $H \leftarrow H/2$.

To detect a traffic sign object of Korea in the front image having a digital form, as the edge hue and the inner background hue which may be included in the traffic sign, the HSV color space may be used. Five kinds (triangle, circle, inverted triangle, octagon, and quadrangle) of traffic sign edge and inner background hues are selected depending on the traffic sign classified in the above Table 1 and four kinds (white, red, blue, and yellow) of meaningful colors are finally selected by an experiment, such that the optimal HSV values corresponding to each color may be determined as in the following Table 2.

TABLE 2

| Division | Hue | Saturation | Brightness Value |
| --- | --- | --- | --- |
| White | 0~360 | 0~70 | 0~255 |
| Red | 226~270 | 80~255 | 0~255 |
| Blue | 0~40 | 80~255 | 0~255 |
| Yellow | 180~224 | 80~255 | 0~255 |

The hue may be separated from the front image using the HSV values shown in the above Table 2. When the hue is separated within the front image using the HSV color space, the sign recognition unit 120 uses the shape characteristics of the traffic sign to extract the traffic sign from each separated hue channel.

As classified in the above Table 2, the traffic sign shows a triangle (including an inverted triangle), a circle (including an octagon), and a quadrangle and the sign recognition unit 120 uses the shape characteristics to classify an object or a region of interest which is split from the image based on the hue or the edge according to a user purpose into a simple form of a triangle, an inverted triangle, a quadrangle, and a circle.

In this case, the sign recognition unit 120 determines a simple shape of a circle to be classified using the number of segments or apexes configuring each figure as shown in the following Table 3.

TABLE 3

| Shape | The number of segments | The number of apexes |
| --- | --- | --- |
| Triangle | 3 | 3 |
| Inverted triangle | 3 | 3 |
| Quadrangle | 4 | 5 |
| Circle | 0 | 0 |

That is, the sign recognition unit 120 extracts an object from the front image based on the hue or edge information and finds out elements like a segment and an apex using the hough transformation to recognize the extracted object as a circle when both of the number of segments and the number of apexes are 0.

Next, the control unit 130 confirms the circular traffic sign recognition using the white inner circle (S250).

That is, the control unit 130 may set the base reference area $R_B$ at the center of the traffic sign circle as illustrated in FIG. 7, set one or a plurality of edge areas R1, R2, . . . , Rn, and calculate the reference value $V_B$ for comparison from the base reference area $R_B$. FIG. 7 is a diagram illustrating an example of defining areas for confirmation inspection according to the exemplary embodiment of the present invention. In this case, the control unit 130 sets one or a plurality of edge areas R1, R2, . . . , Rn within a radius r from an original point Cx,y at a circular center. In FIG. 7, a first edge area R1, a second edge area R2, a third edge area R3, and a fourth edge area R4 are set within the circular radius r based on the original point Cx,y.

According to the exemplary embodiment of the present invention, in an example image of FIG. 7, the confirmation inspection is performed by a comparison between the base reference area $R_B$ and the four setting areas R1, R2, R3, and R4.

The reference value $V_B$ for comparison which is calculated from the base reference area $R_B$ along with max $R_B$ of the $R_B$ area is just the maximum intensity of the $R_B$ area. More detailed contents (any digit or symbol) independent from all other traffic signals similar to the sign illustrated in FIG. 7 may not predict what clear pixel is accurately recognized. Therefore, catching the clearest pixel is just the easiest approach.

Each edge area Rj has an amount of pixels. The control unit 130 may verify a circle at which the white inner circle is accurately positioned when the maximum intensity of the area is brighter than the reference value $R_B$ for comparison or the ratio of pixels within the certain tolerance satisfies the minimum quality threshold value, with respect to one or plurality of edge areas Rj. That is, the pixel ratio within the certain tolerance which is brighter than the $V_B$ or does not remarkably darker than the $V_B$ defines a quality of each area Rj. To verify a circle like the accurately positioned circle, all the areas Rj satisfies the lowest threshold of quality and does not exceed the edge.

Further, the control unit 130 may confirm the circular traffic sign recognition as being correct by the white inner circle being accurately positioned when the ratio of pixels depending on the sharpness of each area is brighter than the reference value for comparison or satisfies the minimum quality threshold value based on the white inner circles of the traffic sign partitioned in a red color or the clear traffic sign as illustrated in FIG. 8, with respect to the classified traffic sign circles. FIG. 8 is a diagram illustrating an example of a white circle optimally targeted according to the exemplary embodiment of the present invention.

Figure 9:
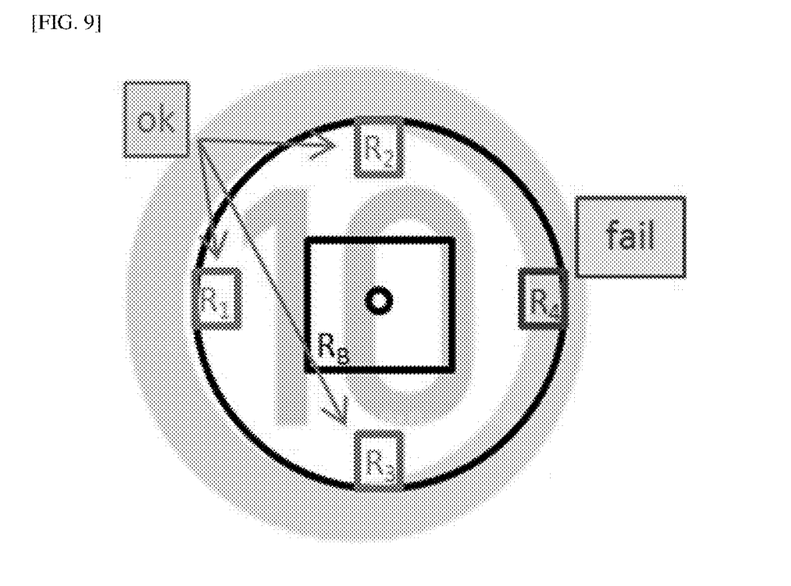
FIG. 9 is a diagram illustrating an example in which the white inner circle is not accurately positioned in the traffic sign circle, according to the exemplary embodiment of the present invention.

However, the control unit 130 compares the first edge area R1, the second edge area R2, the third edge area R3, and the fourth edge area R4 with the reference value $V_B$ for comparison which is calculated from the base reference area $R_B$ as illustrated in FIG. 9 to make the first edge region R1, the second edge area R2, the third edge area R3 brighter than the reference value $V_B$ for comparison or satisfy (ok) the minimum quality threshold value and to determine that the white inner circle is not accurately positioned in the traffic sign circle when the four edge area R4 is not brighter than the reference value $V_B$ for comparison and fails in the minimum quality threshold value. FIG. 9 is a diagram illustrating an example in which the white inner circle is not accurately positioned in the traffic sign circle, according to the exemplary embodiment of the present invention. As illustrated in FIG. 9, the white inner circle is not accurately positioned in the traffic sign circle and therefore the control unit 130 may be determined that the traffic sign recognition is not right. Therefore, according to the exemplary embodiment of the present invention, an outer boundary having outer circle portions of a clear area in the traffic sign is discarded. The circles are too small and thus are hardly classified by other methods.

Therefore, the control unit 130 outputs a message, which guides that the traffic sign recognition is wrong, as a voice or an image through the output unit 150 when the white inner circle is not accurately positioned in the traffic sign circle and allows the driver to recognize the message.

Meanwhile, the apparatus for confirming circular traffic sign recognition according to the exemplary embodiment of the present invention may implement the control unit 130 confirming the circular traffic sign recognition using the white inner circle as a processor for confirming the circular traffic sign recognition.

That is, the processor is implemented as a processor for confirming the circular traffic sign recognition which includes the image acquisition unit acquiring the front image by photographing the front of the vehicle using the camera; and a component electrically connected the sign recognition unit detecting the circular shapes representing the circles of objects from the front image, classifying the traffic sign circles representing the traffic sign, and recognizing the circular traffic sign and confirms the circular traffic sign recognition using the white inner circle and performs a control to inform the driver of the contents of the confirmed circular traffic sign.

As described above, the present invention may be realize the apparatus and method for confirming circular traffic sign recognition capable of classifying the circular shapes indicating the circles of objects in the front image acquired by the front looking camera equipped in the vehicle and recognizing the classified circles as the circular traffic sign when the classified circles are associated with the white inner circle and confirming the recognition.

The present invention may be applied to the apparatus and method for confirming circular traffic sign recognition capable of classifying the circular shapes indicating the circles of objects in the front image acquired by the front looking camera equipped in the vehicle and recognizing the classified circles as the circular traffic sign when the classified circles are associated with the white inner circle and confirming the recognition.

According to the exemplary embodiments of the present invention, it is possible to classify and recognize the circular traffic signal in the front image acquired by photographing the front of the vehicle when the vehicle is driving, and confirm the recognized traffic sign and guide the confirmed traffic signal to the driver.

Therefore, it is possible to allow the driver to safely drive the vehicle depending on the traffic sign even in the bad weather condition by automatically recognizing the circular traffic sign in the vehicle even though the driver does not visually recognize the circular traffic sign under the bad weather condition that it snows and rains a lot and confirming contents of the recognized traffic sign and informing the driver of the confirmed contents.

Although the present invention was described above with reference to exemplary embodiments, it should be understood that the present invention may be changed and modified in various ways by those skilled in the art, without departing from the spirit and scope of the present invention described in claims.

What is claimed is:

1. An apparatus for confirming circular traffic sign recognition, comprising:
   an image acquisition unit configured to photograph a front of a vehicle using a camera to acquire a front image;
   a sign recognition unit detecting circular shapes indicating circles of objects in the front image, classifying traffic sign circles indicating a traffic sign for the circles, and recognizing the circular traffic sign; and
   a control unit confirming the circular traffic sign recognition using a white inner circle and informing a driver of contents of the confirmed circular traffic sign.

2. The apparatus of claim 1, wherein the control unit sets a base reference area at a center of the classified traffic sign circle, sets one or a plurality of edge areas, and calculates a reference value for comparison from the base reference area.

3. The apparatus of claim 2, wherein the control unit verifies a circle at which the white inner circle is accurately positioned when a maximum intensity of the area is brighter than the reference value for comparison or a ratio of pixels within the certain tolerance satisfies a minimum quality threshold value, with respect to the one or the plurality of edge areas.

4. The apparatus of claim 2, wherein the control unit sets the base reference area at the center of the classified traffic sign circle and sets one or the plurality of edge areas within a radius from the center.

5. The apparatus of claim 1, wherein the control unit confirms the circular traffic sign recognition as being correct by the white inner circle being accurately positioned when a ratio of pixels depending on sharpness of each area is brighter than a reference value for comparison or satisfies a minimum quality threshold value based on the white inner circle of a traffic sign partitioned in a red color or a clear traffic sign, with respect to the classified traffic sign circles.

6. A method for confirming circular traffic sign recognition, comprising:
   acquiring a front image by photographing a front of a vehicle using a camera;
   detecting circular shapes indicating circles of objects in the front image;
   classifying traffic sign circles indicating a traffic sign for the circles;
   recognizing a circular traffic sign for the classified traffic sign circles; and
   confirming the circular traffic sign recognition using a white inner circle.

7. The method of claim 6, further comprising setting a base reference area at a center of the classified traffic sign circle, setting one or a plurality of edge areas, and calculating a reference value for comparison from the base reference area.

8. The method of claim 7, further comprising verifying a circle at which the white inner circle is accurately positioned when a maximum intensity of the area is brighter than the reference value for comparison or a ratio of pixels within the certain tolerance satisfies a minimum quality threshold value, with respect to the one or plurality of edge areas.

9. The method of claim 7, further comprising setting the base reference area at the center of the classified traffic sign circle and setting one or the plurality of edge areas within a radius from the center.

10. The method of claim 6, further comprising confirming the circular traffic sign recognition as being correct by the white inner circle being accurately positioned when a ratio of pixels depending on sharpness of each area is brighter than a reference value for comparison or satisfies a minimum quality threshold value based on the white inner circle of a traffic sign partitioned in a red color or a clear traffic sign, with respect to the classified traffic sign circles.

* * * * *